Patented Aug. 5, 1952

2,606,212

UNITED STATES PATENT OFFICE 2,606,212

PERFLUORO-ALKYL-CYCLOHEXANES

Earl T. McBee, West Lafayette, Ind., and Waldo B. Ligett, Detroit, Mich., assignors to Purdue Research Foundation, West Lafayette, Ind., a corporation of Indiana No Drawing. Application July 28, 1944, Serial No. 547,110

8 Claims. (Cl. 260—648)

The present invention is directed to fluorocarbons and is particularly concerned with perfluoro-alkyl-cyclohexanes. We have prepared representative members of this class of compounds, determined their physical and chemical characteristics and found them valuable as heat transfer agents, solvents and lubricants.

The preferred embodiment of the invention resides in fluorocarbons having the following formula

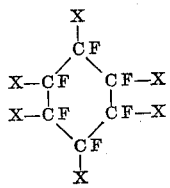

wherein from 1 to 4, inclusive, X symbols represent perfluoro-alkyl radicals each containing from one to eight carbon atoms, inclusive, and the remaining X symbols represent fluorine. These compounds will not support combustion, are very stable to the action of acids and alkalies, and well adapted for use as media for carrying out other organic reactions.

Our new compounds may be prepared by the exhaustive fluorination of alkyl-benzenes, alkyl-cyclohexanes, chloro and bromo substituted alkyl-benzenes and alkyl-cyclohexanes, partially fluorinated alkyl-benzenes and alkyl-cyclohexanes, aryl-olefines, and cyclohexyl-olefines with suitable fluorinating agents. In practice we prefer to carry out the preparation by contacting the benzene or cyclohexane reactant with a finely divided metal perfluoride under conditions of elevated temperature.

In carrying out this reaction, the alkyl-benzene or other organic reactant is contacted with an amount of the metal perfluoride in excess of that theoretically required to bring about perfluorination. The organic reactant may be in the form of a gas, a liquid, or dissolved or suspended in a suitable inert solvent. Because of the tendency of many fluorinating agents to cause decomposition with the formation of undesirable by-products, we prefer to operate according to a procedure in which the perfluorination action is accomplished stepwise and under conditions of progressively increasing temperature. Thus the preparation has been found to proceed in a satisfactory fashion when operating at temperatures gradually increasing from about 150° C. to about 400° C. but preferably below the temperature of undesirable decomposition in the reaction mixture. This is conveniently accomplished by passing the alkyl-benzene or other organic reactant through a suitable fluorinating apparatus at a relatively low temperature e. g. 150° C., and successively recycling the crude reaction product through the same or other reactor units at progressively increasing temperatures until the perfluorination is complete. It has been found that the stability of the reaction mixture increases along with the percentage of organic fluorine contained therein and, while the original reactant might in some instances be undesirably decomposed at the elevated temperatures required to accomplish perfluorination, an intermediate reaction product in which a majority or nearly all of the hydrogen is replaced by fluorine is very stable at such temperature.

Fluorinating equipment adapted to be employed to produce the compounds of the present invention in good yield and purity consists of a metal tube-shaped reactor of considerable length and appreciable diameter and charged with a finely divided metal perfluoride in such fashion that alkyl benzene or other reactant introduced at one end of the reactor and withdrawn at the other is intimately contacted with the particles of fluorinating agent in passing. Such a unit may be operated at any desired temperature through the use of electrical or other heating devices. Where a plurality of such reactors are connected in series, each succeeding unit may be operated at a higher temperature than that preceding, thereby avoiding the mechanical losses involved in transferring the crude reaction mixture from one reactor to another. Suitable reaction equipment also may take the form of a tube of rectangular cross section constructed of sheet copper, nickel, Monel, or mild or stainless steel. The metal perfluorides may be agitated during the passage of the organic reactant therethrough to cause better contact of the organic material with the fluorinating agent.

In operation, the reactor is first charged with the fluorinating agent and thereafter heated to the desired reaction temperature. The alkyl-benzene or other organic reactant is charged into the reactor, and preferably portionwise, and passed slowly therethrough in contact with the hot fluorinating agent. The required period of contact varies with the particular reactant employed, the form of the reactor, and the temperature of operation. Generally a few seconds of contact is sufficient to approach the maximum degree of fluorination possible at the selected temperature of operation. The reactor may then be blown with an inert gas such as nitrogen to sweep out the partially fluorinated or perfluorinated reaction mixture. The effluent products are condensed, successively washed with aqueous alkali and water, and dried. They may then be recycled if desired, or rectified and recycled, or fractionally distilled to separate the desired fluorocarbon product.

Among the metal perfluorides which may be employed to product fluorocarbons falling within the scope of the present invention are silver difluoride, lead tetrafluoride, cerium tetrafluoride, manganese trifluoride, and cobalt trifluoride. Silver difluoride constitutes the preferred fluorinating agent.

Representative of the benzene and cyclohexane compounds adapted to be employed in the reaction are normal-amyl-benzene, secondary-amyl-benzene, tertiaryamyl-benzene, normal-butyl-benzene, secondarybutyl-benzene, tertiary-butyl-benzene, normalbutyl-toluene, 1.4-ditertiarybutyl-benzene, 1.2-diethyl-benzene, 1.3-diethyl-benzene, 1.4-diethyl-benzene, 1.3-diethyl-5-methyl-benzene, 1.2-dimethyl-benzene, 1.3-dimethyl-benzene, 1.4-dimethyl-benzene, ethyl-benzene, 1-ethyl-4-isobutyl-benzene, 1-ethyl-3-isopropyl-benzene, 1-ethyl-4-isopropyl-benzene, 4-ethyl-toluene, hexaethyl-benzene, hexamethyl-benzene, isohexyl-benzene, isopropyl-benzene, cymene, mesitylene, methyl-benzene, pentamethyl-benzene, 1.2.4.5-tetraethyl-benzene, 1.2.4.5-tetramethyl-benzene, 1.2.4-triethyl-benzene, 1.3.5-triethyl-benzene, 1.2.4-trimethyl-benzene, normaloctyl-benzene, secondaryheptyl-benzene, normaloctyl-mesitylene, 1-methyl-3-ethyl-4-secondaryamyl-benzene, allyl-benzene, styrene, 4-chloro-styrene, methyl-cyclohexane, 1.2-dimethyl-cyclohexane, 1.3-dimethyl-cyclohexane, 1.4-dimethyl-cyclohexane, ethyl-cyclohexane, isopropyl-cyclohexane, 1-isopropyl-4-methyl-cyclohexane, tetramethyl-cyclohexane, 1.2.4-trimethyl-cyclohexane, 1.3.5-trimethyl-cyclohexane, tertiarybutyl-cyclohexane, normalamyl-cyclohexane, secondaryhexyl-cyclohexane, normal-heptyl-cyclohexane, tertiaryoctyl-cyclohexane, octadecyl-cyclohexane, 4-cyclohexyl-butene-1, and the like, as well as halogenated derivatives of the above other than the perfluoro derivatives of the cycloalkanes.

The following examples illustrate the invention, but are not to be construed as limiting:

*Example 1*

A twelve-foot copper tube 1.25 inches in diameter and electrically heated was packed with finely divided silver difluoride and heated to 150° C. Para-cymene was passed into and through this reactor, and the resulting crude reaction product recycled four times at temperatures progressively increasing from 150° C. in the first pass to 360° C. A ten to fifteen hour period was required for each pass and the crude product was washed, dried and rectified between fluorinations. Also the silver difluoride fluorinating agent was intermittently regenerated by passing gaseous fluorine through the reaction tube.

As an ultimate product there was obtained a mixture which on fractional distillation was found to contain approximately 80% by weight of perfluoro-1-methyl-4-isopropyl-cyclohexane i. e. eicosafluoro-1-methyl-4-isopropyl-cyclohexane. This compound boils at 143°–144° C. at 743 millimeters mercury pressure and has the formula

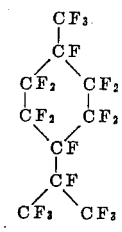

*Example 2*

A fluorinating apparatus consisting of a series of six connected reactors were packed with silver difluoride and heated so that the temperature of the units gradually increased from 100° C. to 300° C. 549 grams of ethyl-benzene was passed through this series of reactors over a period of three hours to obtain a total of 1281 grams of crude product. This product was recycled through the fluorinating units at temperatures gradually increasing from 290° to 340° C. The fluorinating train was then blown with nitrogen and all liquid reaction products collected. A total of 1218 grams of mixed product was washed, dried, and fractionally distilled to obtain 940 grams of perfluoro-ethyl-cyclohexane boiling at 99°–99.8° C. at 748 millimeters mercury pressure. This compound has the formula

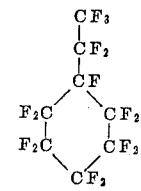

*Example 3*

The reactor as described in Example 1 was packed with silver difluoride and heated to 190° C. 50 milliliters of isopropyl-benzene was introduced portionwise into the reactor over a period of two hours. The temperature of the reactor was then raised to 280° C. and maintained for 1.5 hours. At the end of this time the reactor was blown with nitrogen for four hours to recover 83 grams of liquid material. The latter was recycled at reactor temperatures of 190° C., 300° C. and 360° C. Fractional distillation of the resulting crude product gave a substantial yield of perfluoro-isopropyl-cyclohexane i. e. octadecafluoro-isopropyl-cyclohexane. This compound boils at 123° C. at 751 millimeters mercury pressure and has the formula

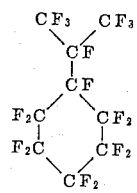

*Example 4*

The same fluorinating reactor as described in Example 1 was charged with silver difluoride, heated to 190° C., and 50 milliliters of an isomeric diethyl-benzene mixture introduced therein over a period of two hours. The temperature of the reactor and contents was then raised to 280° C. for a period of 1.5 hours, after which the reactor was blown with nitrogen to recover 89 grams of crude material. This product was recycled at 190° C., 300° C., and 360° C., and thereafter fractionally distilled to obtain a substantial yield of perfluoro-diethyl-cyclohexanes i. e. eicosa-fluoro-diethyl-cyclohexanes, boiling at 142°–142.5° C. at 751 millimeters mercury pressure.

*Example 5*

Operating in a similar fashion, mixed xylenes are perfluorinated by contact with silver difluoride at temperatures increasing from 125° to 325° C. to obtain a mixture of isomeric perfluoro-dimethyl-cyclohexanes, i. e. hexadecafluoro-dimethyl-cyclohexanes, boiling at 100° C. at 738 millimeters mercury pressure.

*Example 6*

A result similar to that shown in the preceding example was obtained when a mixture of isomeric bis-(trifluoromethyl)-benzenes was substituted for mixed xylenes. In the perfluorination of this product with silver difluoride, somewhat higher initial temperatures of reaction were practicable than when starting with the xylenes.

By substituting other alkyl-benzenes, alkyl cyclohexanes, halo-alkyl-benzenes, halo-alkyl-cyclohexanes, and the like for those alkyl-benzenes employed in the examples, analogous fluorocarbons may be obtained. The following are representative: perfluoro-methyl-cyclohexane, perfluoro-secondaryamyl-cyclohexane, perfluoro-1.3-diethyl-5-methyl-cyclohexane, perfluoro - tetramethyl-cyclohexane, perfluoro - 1.3.5-trimethyl-cyclohexane, perfluoro-pentamethyl-cyclohexane, perfluoro-normaloctyl-cyclohexane, perfluoro-4-normaloctyl - 1.3.5 - trimethyl-cyclohexane, perfluoro-tertiaryoctyl-cyclohexane and perfluoro-octadecyl-cyclohexane.

We claim:

1. A perfluoro-dialkyl-cyclohexane fluorocarbon wherein the alkyl groups each contain from 1 to 8 carbon atoms, inclusive.
2. Perfluoro-dimethyl-cyclohexanes.
3. Perfluoro - 1-methyl-4-isopropyl - cyclohexane.
4. A perfluoro polyalkylcyclohexane wherein the alkyl groups contain from one to eight carbon atoms, inclusive.
5. A perfluoro-branched-chain-alkyl-cyclohexane.
6. A compound selected from the group consisting of perfluoropolyalkylcyclohexanes and perfluoro branched-chain alkylcyclohexanes.
7. A perfluorodiethylcyclohexane.
8. A perfluoropolyalkylcyclohexane.

EARL T. McBEE.
WALDO B. LIGETT.

REFERENCES CITED

The following references are of record in the file of this patent:

FOREIGN PATENTS

| Number | Country | Date |
|---|---|---|
| 786,123 | France | Aug. 27, 1935 |

OTHER REFERENCES

Simons et al., "J. Am. Chem. Soc.," vol. 61, pp. 2962–6 (1939).

Fukuhara et al., "Jour Am. Chem. Soc.," vol. 63, pp. 2792–5 (1941).

Grosse et al., "Chemical and Physical Properties of Fluorocarbons," pp. 1–3 (1942).